(12) United States Patent
Siegel

(10) Patent No.: US 7,297,061 B2
(45) Date of Patent: Nov. 20, 2007

(54) GAME CONTROLLER HAVING MULTIPLE OPERATION MODES

(75) Inventor: Mark Siegel, Fort Worth, TX (US)

(73) Assignee: Mattel, Inc., El Segundo, CA (US)

( * ) Notice: Subject to any disclaimer, the term of this patent is extended or adjusted under 35 U.S.C. 154(b) by 701 days.

(21) Appl. No.: 10/738,282

(22) Filed: Dec. 16, 2003

(65) Prior Publication Data

US 2004/0176166 A1 Sep. 9, 2004

Related U.S. Application Data

(60) Provisional application No. 60/433,613, filed on Dec. 16, 2002.

(51) Int. Cl.
*A63B 13/00* (2006.01)
(52) U.S. Cl. ............................ 463/37; 463/30; 463/38; 463/46; 463/47; 200/61.1
(58) Field of Classification Search .................. 463/30, 463/37, 38, 46, 47; 200/61.1
See application file for complete search history.

(56) References Cited

U.S. PATENT DOCUMENTS

| | | | |
|---|---|---|---|
| 3,893,028 A | 7/1975 | Febvre et al. | |
| 4,225,929 A | 9/1980 | Ikeda | |
| 4,227,785 A | 10/1980 | Herbert | |
| 4,307,266 A | 12/1981 | Messina | |
| 4,786,892 A * | 11/1988 | Kubo et al. | ................... 341/20 |
| 4,969,647 A * | 11/1990 | Mical et al. | ................... 463/31 |
| 5,014,046 A | 5/1991 | Minami | |
| 5,305,397 A | 4/1994 | Yamaguchi et al. | |
| 5,545,857 A * | 8/1996 | Lee et al. | ................. 178/18.03 |
| 5,624,117 A | 4/1997 | Ohkubo et al. | |
| 5,738,352 A * | 4/1998 | Ohkubo et al. | .......... 273/148 B |
| 5,759,100 A * | 6/1998 | Nakanishi | ..................... 463/37 |

(Continued)

FOREIGN PATENT DOCUMENTS

FR 2 846 112 4/2004

OTHER PUBLICATIONS

Eppendorf, TransferMan NK-Operating MAnual, 2001, Eppendorf AG, Hamburg, pp. 1-1, 5-12 and, 5-13.*

*Primary Examiner*—John Hotaling
*Assistant Examiner*—Adetokunbo Torimiro
(74) *Attorney, Agent, or Firm*—Bell, Boyd & Lloyd LLP

(57) ABSTRACT

The game controller including at least one control such as a joystick which includes at least two modes of operation. The game controller includes an invert switch which enables a player to switch between the different modes of operation. In one embodiment, the game controller includes a control which has a normal mode and an invert mode. The normal mode enables a player to move the joystick up or forward to correspondingly move up on the game display or move the joystick down or backward to correspondingly move on the game display. Conversely, the invert mode enables a player to move the joystick up or forward to correspondingly move down on the display and also move the joystick down or backward to move up on the display. The game controller enables the player to switch between the different modes of operation on the game controller itself instead of through the video game system or software for the game.

45 Claims, 4 Drawing Sheets

U.S. PATENT DOCUMENTS

| | | |
|---|---|---|
| 5,793,312 A | 8/1998 | Tsubai |
| 6,208,325 B1 | 3/2001 | Reddy et al. |
| 2002/0080143 A1 | 6/2002 | Morgan et al. |
| 2003/0107551 A1 | 6/2003 | Dunker |

* cited by examiner

GAME CONTROLLER HAVING MULTIPLE OPERATION MODES

PRIORITY CLAIM

This application is a non-provisional patent application of and claims the benefit of U.S. Provisional Patent Application Ser. No. 60/433,613 filed on Dec. 16, 2002.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

In the video game industry, there are several different types of game controllers or video game pads for video games. Video game players use the video game controllers to control and manipulate different functions or operations in the video games. The video game controllers typically include different controls or input devices such as buttons, triggers or joysticks to control these operations.

Conventional video game controllers include at least one joystick for allowing a player to operate and play a video game, such as for moving, looking and steering in various directions within the game. A typical joystick includes only a single or normal mode of operation. For example, a joystick of a conventional controller is configured such that when a player moves or pushes the joystick upwardly and downwardly, respectively, the game responds by moving up and down, respectively. Players, however, often prefer controlling the video game in the opposite manner. That is, some players prefer moving the joystick upwardly and downwardly to result in the game moving down and up, respectively, similar to the directional movements made when flying an airplane. The conventional controllers do not include mechanisms for providing an opposite or inverted mode of operation in addition to the normal mode of operation. As a result, any dual mode operation capability must be setup or incorporated into the video game software. The setup is often complicated, time consuming and generally requires players to pause or quit a game to switch operation modes.

Accordingly, to accommodate different preferences of players, there is a need for a video game controller that enables players to quickly and easily switch between different modes of operation such as between a normal mode and an inverted mode.

SUMMARY OF THE INVENTION

The present invention is directed to a game controller used with a video game systems such as XBOX® or PlayStation® systems. The game controller enables a player to switch between multiple control or operational modes such as a normal mode and an inverted mode, for operating and controlling the video game system using the game controller.

In one embodiment, the game controller includes a switch mechanism having a switch such as a mechanical switch or the like which enables a player to switch between different modes of operation of at least one control device on the game controller associated with the video game system. The switch mechanism is located on the game controller and enables a player to switch from one mode of operation to another mode of operation to change the operation of one or more control devices on the game controller.

In one embodiment, a control device connected to the game controller includes two modes of operation, a normal or default mode of operation and an invert or inverted mode of operation. In the normal or default mode of operation, a player moves the control device, such as a joystick, forward or upward to move a corresponding indicator or other component on a video game display upward. Similarly, the player moves the joystick downward or backward to move the corresponding indicator on the video game display downward.

Conversely, in the inverted or invert mode, the player moves the joystick upward or forward to move the corresponding indicator downward or down on the video game display. Alternatively, the player moves the joystick downward or backward to move the corresponding indicator upward or up on the video game display. Therefore, the invert or inverted mode enables a player to move a control device such as a joystick to move an indicator or other component on a video display in the opposite directions to the movements of the indicator associated with the normal mode on the video game display.

Accordingly, the present invention enables a player to simply move the switch on the game controller from the normal mode to the invert mode or from the invert mode to the normal mode to switch the mode of operation to a players' desired mode of operation for the control device. As a result, the player may switch modes of operation before, during or after the player plays a game on a video game system. The present invention is significantly easier and simpler to use than known devices and methods for switching modes of operation because the known devices employ complex set up procedures which are often performed by pausing or quitting a game.

In one embodiment, the game controller includes a control such as a joystick and a switch which enables the player to switch from one mode of operation to the another mode of operation for the joystick. In another embodiment, the game controller includes a plurality of control devices such as a plurality of joysticks and a plurality of switches where each switch enables the player to switch the mode of operation for each joystick. In a further embodiment, the game controller includes a plurality of controls or joysticks and a single switch which switches the mode of operation for each of the joysticks when the player switches the mode of operation using the switch. It should be appreciated that any suitable number of controls or joysticks and switches may be employed by the present invention.

Accordingly, an advantage of the present invention is to provide a game controller that enables a player to change between different modes of operation for the control device and bypass complicated setup procedures associated with the game.

Another advantage of the present invention is to provide a control device for a game controller including dual modes of operation that allows a player to choose between the dual modes of operation by actuating a switch conveniently located on the game controller.

Additional features and advantages of the present invention are described in, and will be apparent from, the following Detailed Description of the Invention and the figures.

DETAILED DESCRIPTION OF THE INVENTION

Figure 1:
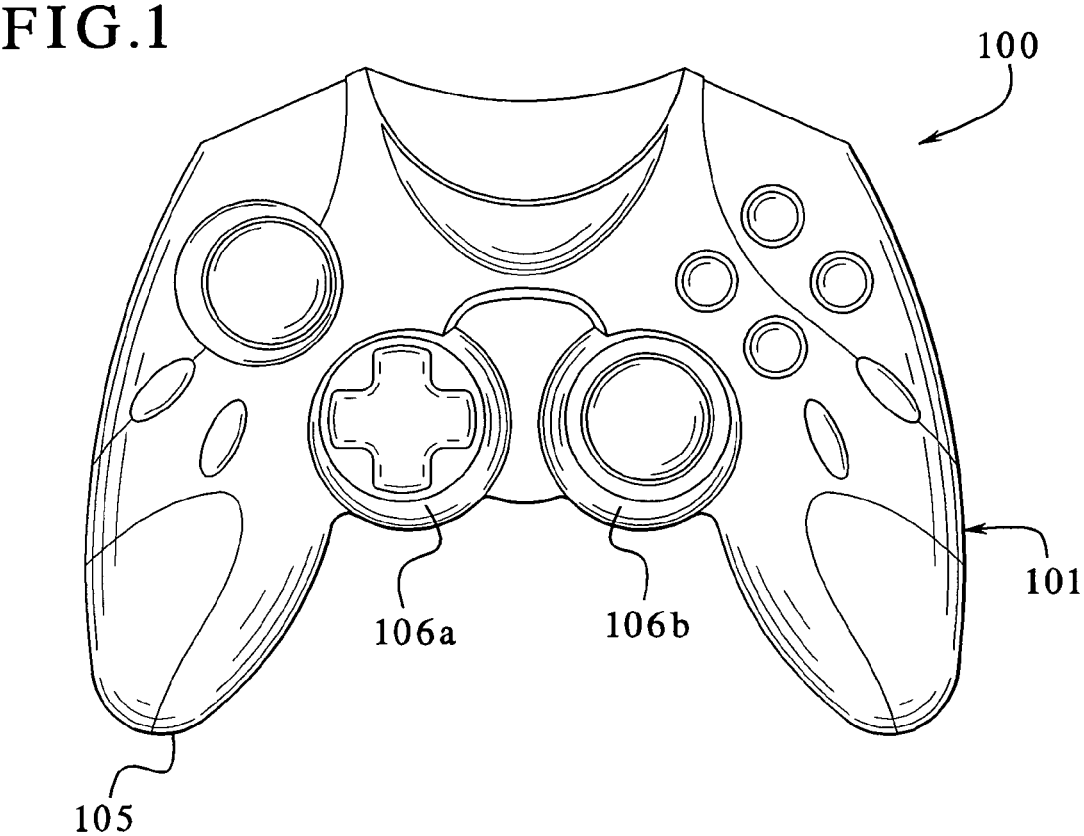
FIG. 1 is a top plan view of the game controller in accordance with an embodiment of the present invention showing the controls and decorative cover.
Figure 2:
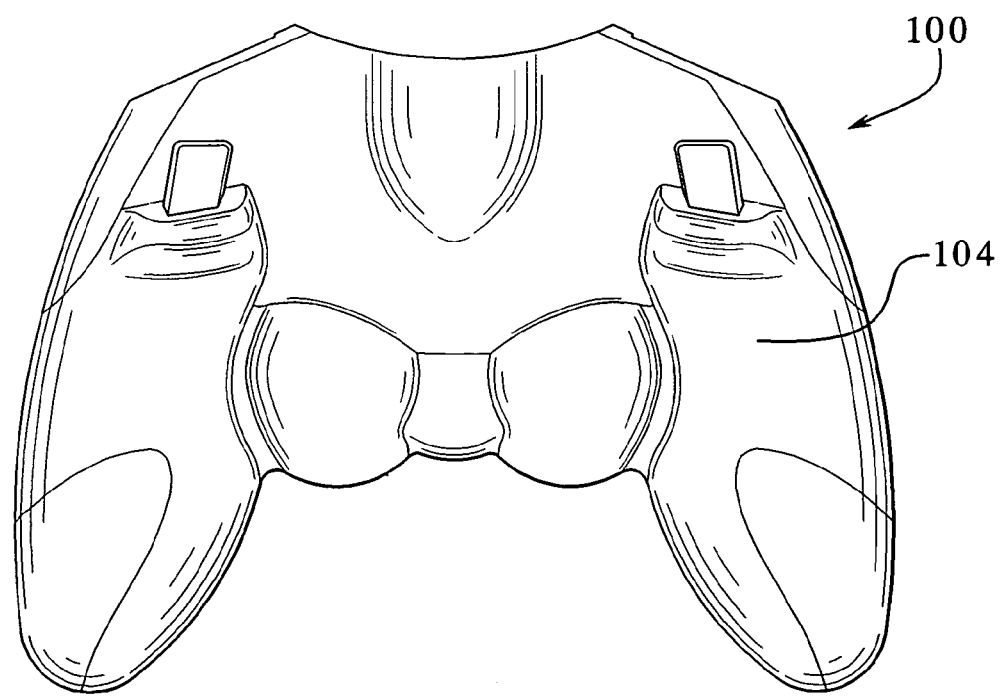
FIG. 2 is a bottom view of the game controller illustrated in FIG. 1.
Figure 3A:
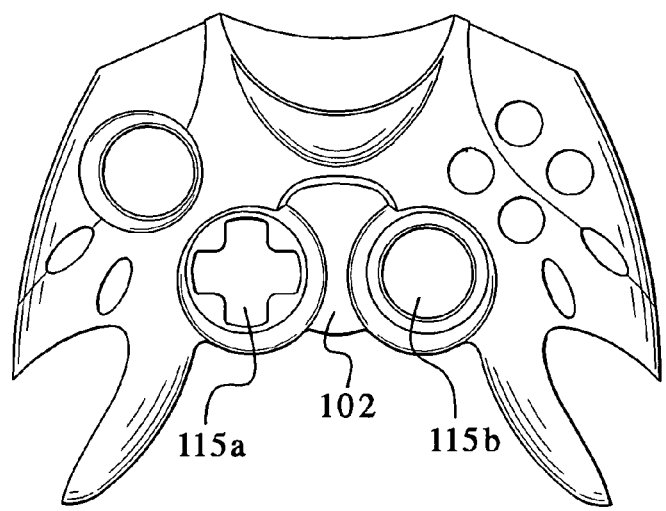
FIG. 3A is a top view of the top housing of the game controller illustrated in FIG. 1.
Figure 3B:
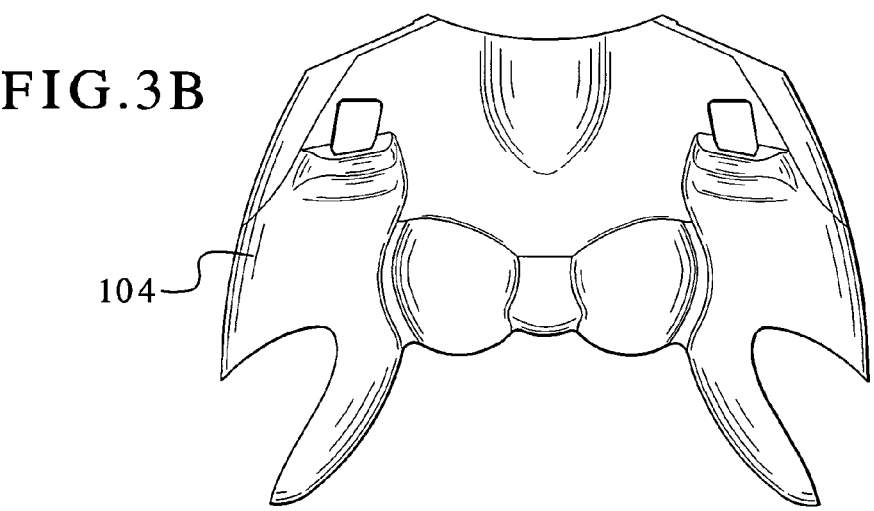
FIG. 3B is a bottom view of the bottom housing of the game controller illustrated in FIG. 1.
Figure 3C:
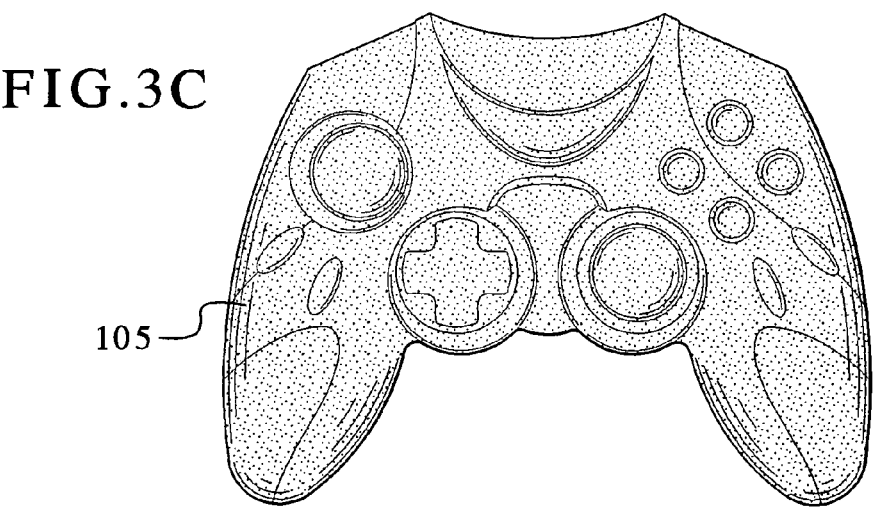
FIG. 3C is a top view of the decorative cover of the game controller illustrated in FIG. 1.
Figure 4A:
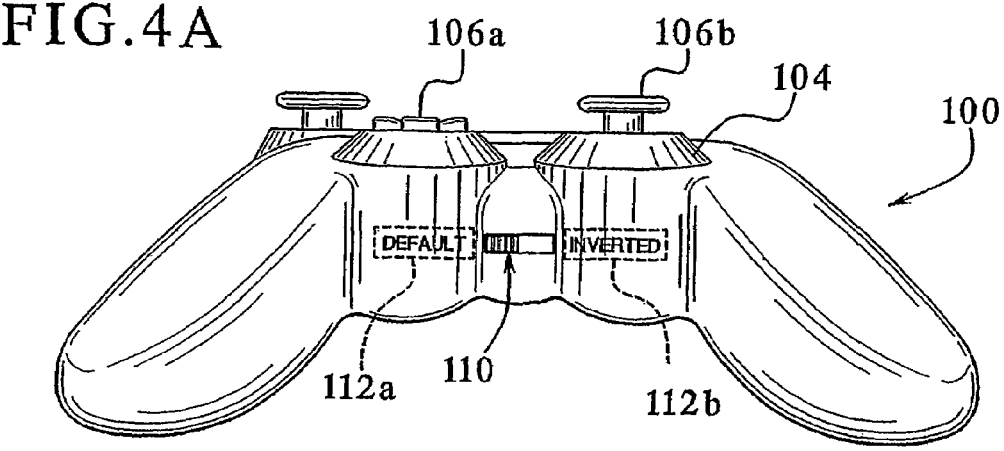
FIG. 4A is a front elevation view of the game controller illustrated in FIG. 1, showing the invert switch for switching between dual modes of operation.
Figure 4B:
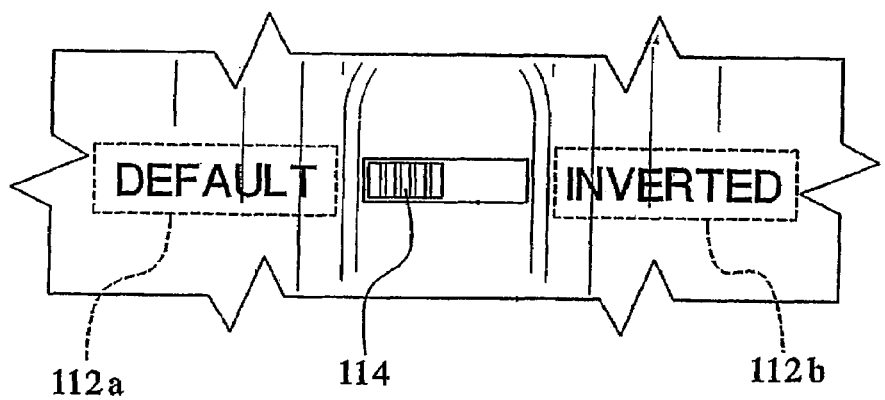
FIG. 4B is an enlarged elevation view of the embodiment of the invert switch illustrated in FIG. 4A.
Figure 4C:
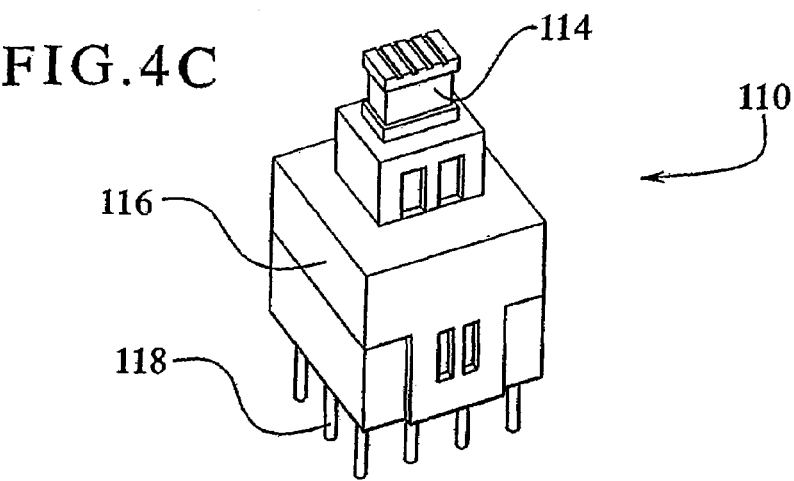
FIG. 4C is an enlarged perspective view of the switch mechanism employed in the game controller illustrated in FIG. 1.
Figure 5:
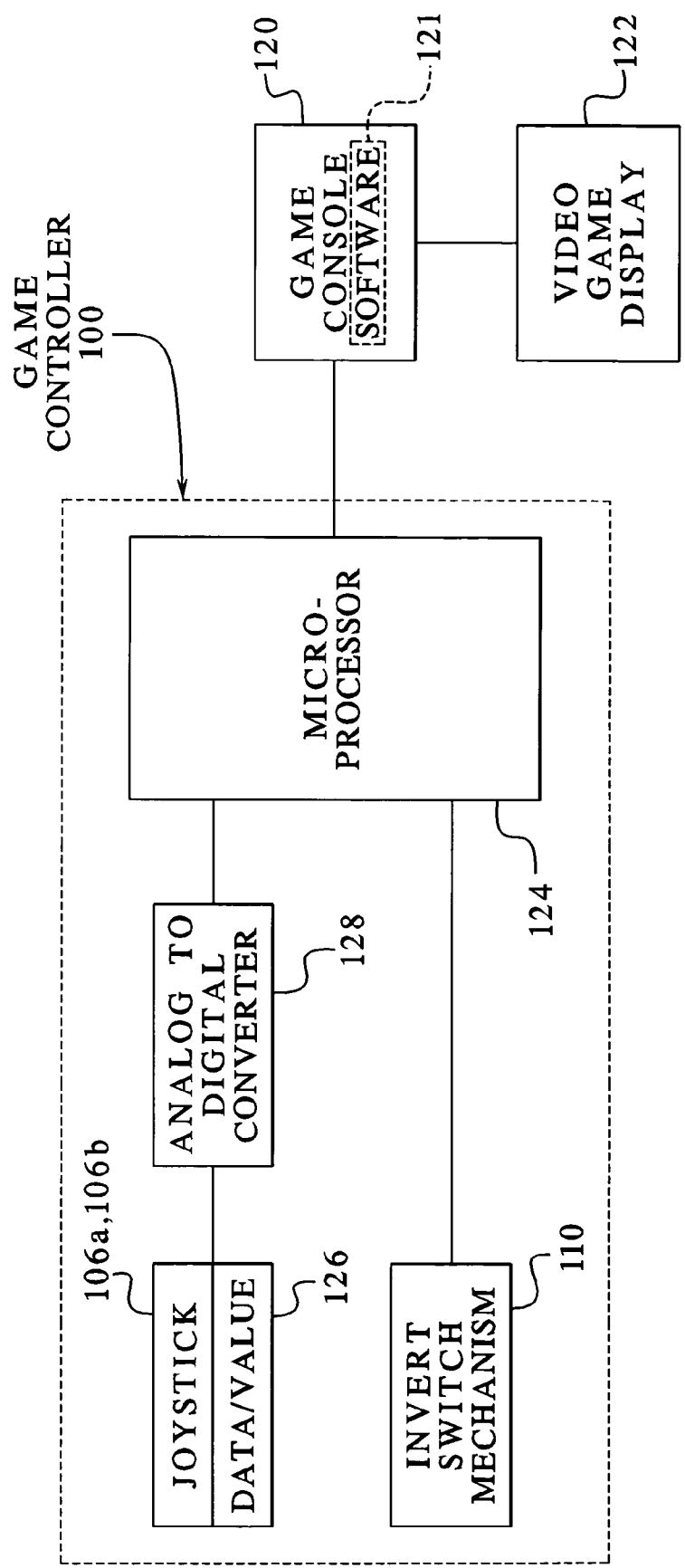
FIG. 5 is a schematic block diagram of the electronic configuration of one embodiment of the game controller of the present invention.

Referring to FIGS. 1 to 5, a game controller 100 of the present invention operates a video game system. In particular, the game controller 100 communicates with a game console 120 of the video game system (not shown) to operate a game, as is well known in the art. Generally, game controller 100 includes a housing 101 having a top member 102 and a bottom member 104 that includes at least one control or control device, but preferably includes multiple control devices such as first and second controls or first and second joysticks 106a and 106b, and supports electronics therein including a microprocessor 124, as illustrated in FIG. 5, which communicates with the game software 121 associated with the game console 120, using at least one electrical connector or electrical connection. The top housing 102 include openings or slots such as openings 115a and 115b that correspond to each of the control devices 106a and 106b. The top housing 102 connects to or is otherwise attached to bottom housing 104 to enclose the internal components of the game controller such as the microprocessor 124.

In one embodiment, a decorative cover 105 is attached to the outside of at least the top housing 102 and includes openings that correspond to the size and shape of the control devices on the game controller. The decorative cover may be made using a suitable material such as rubber, plastic or the like.

In one embodiment, the first and second joysticks 106a and 106b output analog data corresponding to the direction (e.g. up, down, right, left) of the joysticks 106a and 106b as the joysticks are operated by a player of the video game. The analog data from joysticks 106a and 106b is converted to digital data and communicated to the microprocessor 124 of game controller 100 which in turn communicates with the video game software 121 to operate the game.

In one embodiment, the game controller 100 includes a switch mechanism 110 for switching between different modes of operation (i.e., normal/default mode and the invert mode) for a control device, which enables a player to choose between the different modes of operation. For example, in the normal or default mode, actuating the control device or joystick 106b upwardly directs a corresponding indicator, icon or the like on the video game display 122 upwardly, and likewise, actuating the joystick 106b downwardly directs the indicator downwardly on the display 122.

Conversely, in the invert or inverted mode, actuating the joystick downwardly directs the indicator of the video game upwardly on the display and actuating the joystick upwardly directs the indicator of the video game downwardly on the display, similar to the control device of an airplane. It should be appreciated that normal and invert modes can be set for either of the above operations as long as the normal and invert modes result in opposite responses of an indicator or indicators in the video game, respectively, when a player is operating joysticks 106a or 106b of the game controller 100.

Also, it should be appreciated that the switch mechanism 110 may be associated with any directional movement associated with a video game, such as up, down, left, right or diagonal directions or any other suitable directional movement of a control device. In one embodiment, the normal mode directs an indicator of a video game to the right and left in response to actuation of the joysticks 106a or 106b to the right and left, respectively, and the inverted mode directs the indicator of the video game to the left and right in response to actuation of the joysticks 106 or 106b to the left and right, respectively.

In one embodiment, switch mechanism 110 includes switch housing 116 and a switch such as mechanical switch 114 (shown in FIGS. 4A, 4B and 4C) connected to the switch housing, where the switch 114 is operated by a player of the video game to achieve the preferred mode of operation for the control device. In one embodiment, switch 114 employs a hardware "flag" that electrically communicates with the microprocessor 124 of game controller 100 via one or more electrical connectors 118 to indicate which mode of operation has been selected by a player. In particular, the player physically moves the switch 114 to either the normal or default mode, or to the invert or inverted mode. The switch 114 then communicates the player's selection to microprocessor 124. Switch 114 remains in a constant state (i.e., normal or invert mode) until the player subsequently moves the switch 114.

In another embodiment, switch 114 employs a software flag. In this embodiment, switch 114 temporarily remains in either the normal or invert states or modes. The microprocessor 124 is programmed to recognize the state, mode or position of switch 114 before and after the switch is actuated by the player, as described above, and returns switch 114 to its original state after a preset period of time.

Once the microprocessor 124 receives the output data 126 from joysticks 106a and 106b and the desired mode of operation, the microprocessor 124 communicates this data to the game console 120. Specifically, when the player selects the normal mode of operation, the player either leaves switch 114 in the normal/default position or physically moves the switch from the invert position to the normal/default position. The microprocessor 120 communicates the output data or value 126 from the joysticks 106a and/or 106b to game console 120, as is known in the art. When the player selects the opposite mode or the invert mode of operation by either moving switch 114 to the invert position or leaving switch 114 in the invert position, microprocessor 124 communicates the inverted data or value to game console 120 by one of two methods.

A first method of inverting the joystick data or value employs a potentiometer. A potentiometer has three connections: a plus connection, a "wiper" connection, and a ground connection where the plus and wiper connections have either a "plus" or a "minus" resistance. In the normal mode of operation, for example, as the wiper connection moves away from the ground connection, the resistance increases which thereby increases the control value or joystick value at the analog to digital converter 128. Accordingly, to produce an inverted value, the plus and ground connections are physically swapped.

A second method of inverting the joystick data or value employs a mathematical method using the maximum value that can be produced by the circuit. The maximum value is electrically determined based on the components and software of the game controller 100. An inverted or invert value is determined by subtracting a read value or actual value of the joystick output value from the known maximum value. For example, if the maximum value is sixty-four and the output value received from the joysticks 106*a* or 106*b* (through the analog to digital converter 128) is forty, the inverted value is twenty-four (i.e., (64−40)=24).

Once the inverted values are determined by either of the above two methods, the microprocessor 124 communicates the inverted values to the game console 120 and software 121 which directs the indicator or indicators of the video game to respond accordingly. Since the game software receives the inverted values, the software directs the game as if the player were operating the controls or joysticks in the opposite direction.

Accordingly, the present invention enables a player to invert the operation of one or more control devices on a game controller instead of using complicated setup procedures employed by the game software. In particular, the present invention enables a player to easily switch the mode of operation for the control device by actuating, changing or moving switch 114 located on the game controller 100 to a desired operational mode.

In another embodiment, at least one indicator such as first and second indicators 112*a* and 112*b*, respectively, are associated with each of the different modes of operation to identify the mode of operation. For example in FIGS. 4A and 4B, the first indicator 112*a* and the second indicator 112*b* each include text or a phrase such as "DEFAULT" and "INVERTED" which identify the different modes associated with switch 114. It should be appreciated that the indicators may be text, audio, audio-visual, symbols or any suitable indicator that identifies the modes of operation.

In an alternative embodiment, the game controller includes a plurality of control devices such as a plurality of joysticks. Each of the joysticks is controlled by a single switch mechanism. In this embodiment, a player uses the switch mechanism to change the mode of operation to the same mode of operation for all of the control devices. In another embodiment, the game controller includes a plurality of switch mechanisms where each switch mechanism is associated with a different control device. In this embodiment, the player uses each switch mechanism to change the operational mode for one or more of the control devices. It should be appreciated that any suitable number of control devices and switch mechanisms may be included on the game controller to control the operations of one or more of the control devices.

In one embodiment the control device of the game controller is a touch screen.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A controller for a video game system comprising:
   a housing;
   a control device connected to the housing, said control device having an axis of control with a first operational mode and a second operational mode, the first operational mode being an inversion of the second operational mode;
   a switch mechanism connected to the housing and in communication with said control device, said switch mechanism enabling a player to select the first operational mode or the second operational mode for the control device; and
   a processor included in the housing and in communication with the control device and the switch mechanism, said processor operable to determine whether the player has selected the first operational mode or the second operational mode and employ the first operational mode or the second operational mode of the control device based on the selection made by the player.

2. The controller of claim 1, wherein the control device includes a joystick.

3. The controller of claim 1, wherein the control device includes a button.

4. The controller of claim 1, wherein the control device includes a touch screen.

5. The controller of claim 1, wherein the switch mechanism includes a mechanical switch.

6. The controller of claim 1, wherein the switch mechanism includes a button.

7. The controller of claim 1, wherein the first operational mode includes at least one first operation for the control device and the second operational mode includes at least one second operation for the control device.

8. The controller of claim 7, wherein the first operation and the second operation are different.

9. The controller of claim 7, wherein the first operation and the second operation are opposite operations.

10. The controller of claim 1, which includes the plurality of control devices connected to the housing, wherein the switch mechanism enables the player to select the first operational mode or the second operational mode for a plurality of the control devices.

11. The controller of claim 1, which includes a plurality of control devices connected to the housing, wherein the switch mechanism enables the player to select the first operational mode or the second operational mode for all of the control devices.

12. The controller of claim 1, which includes at least one first indicator associated with the first operational mode and at least one second indicator associated with the second operational mode.

13. A controller for a video game system comprising:
   a housing;
   a control device connected to the housing and configured for on-screen manipulation of game play, said control device having at least one axis of control with a normal operational mode and an inverted operational mode;
   a switch mechanism connected to the housing and in communication with said control device, said switch mechanism including a first position and a second position, said first position being associated with the normal operational mode and said second position being associated with the inverted operational mode, said switch mechanism enabling a player to select the normal operational mode or the inverted operational mode by moving the switch to one of the first position and the second position; and a processor included in the housing and in communication with the control device and the switch mechanism, said processor operable to enable the player to move the switch to the first or the second position, determine whether the switch mechanism is in the first position or the second position and cause the control device to operate according to the normal operational mode or the inverted operational mode based on the determined position of the switch.

14. The controller of claim 13, wherein the normal operational mode causes the control device to operate according to a first set of operations and the inverted operational mode causes the control device to operate according to a second set of operations, wherein at least one operation in said first set of operations is opposite to the operations in said second set of operations.

15. The controller of claim 13, wherein the normal operational mode causes the control device to operate according to a first set of operations and the inverted operational mode causes the control device to operate according to a second set of operations, wherein said first set of operations are opposite to the operations in said second set of operations.

16. The controller of claim 13, wherein the switch mechanism includes a mechanical switch.

17. The controller of claim 13, wherein the switch mechanism includes a button.

18. The controller of claim 13, which includes the plurality of control devices connected to the housing, wherein the switch mechanism enables the player to select the normal operational mode or the inverted operational mode for a plurality of the control devices.

19. The controller of claim 13, which includes a plurality of control devices connected to the housing, wherein the switch mechanism enables the player to select the normal operational mode or the inverted operational mode for all of the control devices.

20. The controller of claim 13, which includes at least one first indicator associated with the normal operational mode and at least one second indicator associated with the inverted operational mode.

21. A method of operating a video game controller, said method comprising:
(a) providing a hand-held game controller including at least one control device for use in on-screen manipulation of video game play, said control device including an axis with a first operational mode and a second operational mode, the first operational mode being the inverse of the second operational mode;
(b) enabling a player to select the first operational mode or the second operational mode for the control device using a switch mechanism connected to the game controller and in communication with said control device;
(c) determining whether the player has selected the first operational mode or the second operational mode; and
(d) activating the first operational mode or the second operational mode of the control device based on the selection made by the player.

22. The method of claim 21, wherein providing the game controller including a control device includes providing a game controller including a joystick.

23. The method of claim 21, wherein providing the game controller including a control device includes providing a game controller including a button.

24. The method of claim 21, wherein providing the game controller including a control device includes providing a game controller including a touch screen.

25. The method of claim 21, wherein providing the game controller including a control device includes providing a game controller including a mechanical switch.

26. The method of claim 21, wherein the operations of the first operational mode are opposite to the operations of the second operational mode.

27. The method of claim 21, wherein enabling the player to select the first operational mode or the second operational mode includes enabling the player to select the first operational mode or the second operational mode for a plurality of control devices connected to the game controller.

28. The method of claim 21, which includes providing at least one first indicator associated with the first operational mode and at least one second indicator associated with the second operational mode, wherein the first indicator and the second indicator are included on the game controller.

29. A method of operating a video game controller, said method comprising:
(a) providing a hand-held game controller including at least one control device and a switch mechanism connected to the game controller, said control device including an axis of control with a normal operational mode and an inverted operational mode, said switch mechanism being changeable between a first position and a second position, wherein said first position is associated with the normal operational mode and the second position is associated with the inverted operational mode;
(b) enabling a player to select the first position or the second position using the switch mechanism;
(c) determining whether the player has selected the first position or the second position based on the position of the switch mechanism; and
(d) activating the normal operational mode or the inverted operational mode of the control device based on the determined position of the switch mechanism.

30. The method of claim 29, which includes associating a first set of operations with the normal operational mode and second set of operations with the inverted operational mode, wherein at least one operation in said first set of operations is opposite to the operations in said second set of operations.

31. The method of claim 29, which includes associating a first set of operations with the normal operational mode and second set of operations with the inverted operational mode, wherein all of the operations in said first set of operations are opposite to the operations in said second set of operations.

32. The method of claim 29, wherein enabling the player to select the normal operational mode or the inverted operational mode includes enabling the player to select the normal operational mode or the inverted operational mode for a plurality of control devices connected to the game controller.

33. The method of claim 29, which includes providing at least one first indicator associated with the normal operational mode and at least one second indicator associated with the inverted operational mode, wherein the first indicator and the second indicator are included on the game controller.

34. The method of claim 21, wherein activating the first operational mode or the second operational mode includes electrically switching to the first operational mode or the second operational mode based on the selection made by the player.

35. The method of claim 21, wherein activating the first operational mode or the second operational mode includes changing input data generated by the control device to activate the first operational mode or the second operational mode based on the selection made by the player.

36. The method of claim 29, wherein activating the normal operational mode or the inverted operational mode includes electrically switching to the first operational mode or the second operational mode based on the determined switch position of the switch mechanism.

37. The method of claim 29, wherein activating the normal operational mode or the inverted operational mode includes changing input data generated by the control device to activate the normal operational mode or the inverted operational mode based on the determined switch position of the switch mechanism.

38. A controller for a video game system, comprising:
a housing sized and configured to be hand-held;
a control device coupled to said housing and having at least one axis of control with a first operational mode and a second inverted operational mode, each of said operational modes configured to operate without substantially inverting said housing; and
electrical circuitry in communication with the control device, said electrical circuitry operable to determine whether the first operational mode or the second operational mode has been selected and employ the first operational mode or the second operational mode of the control device based on the selection.

39. The controller of claim 38, wherein the control device includes a joystick.

40. The controller of claim 39, wherein the first operational mode and the second operational mode are opposite.

41. The controller of claim 39, wherein the control device includes at least four buttons.

42. The controller of claim 41, wherein the first operational mode and the second operational mode are opposite.

43. The controller of claim 41, wherein said first operational mode and said second operational mode are configured to operate without substantially inverting said at least four buttons.

44. A game controller, comprising:
a body;
at least one input button positioned on said body;
a joystick adjacent said at least one input button and having at least one axis of control, the joystick configured for use in on-screen video game play; and
electrical circuitry adapted to allow selective inversion of said at least one axis of control without substantially inverting said body.

45. A game controller according to claim 44, wherein
said at least one axis of control includes at least two axes of control; and
said electrical circuitry adapted to allow selective inversion of at least one of said at least two axes of control.

* * * * *